Patented Nov. 21, 1933

1,936,172

UNITED STATES PATENT OFFICE 1,936,172

TREATMENT OF ORGANIC COMPOUNDS

Horace Finningley Oxley and Leonard Fallows, Spondon, near Derby, England, assignors to Celanese Corporation of America, a corporation of Delaware No Drawing. Application April 14, 1931, Serial No. 530,136, and in Great Britain May 30, 1930

11 Claims. (Cl. 202—42)

This invention relates to the concentration of aqueous or other solutions of organic substances and especially to the production of concentrated acetic or other lower aliphatic acids from their aqueous solutions.

The production of substantially anhydrous acetic acid from dilute acetic acid by simple distillation is a tedious operation necessitating a large consumption of heat. A more satisfactory method is to distil the dilute acid in the presence of substances which yield with water azeotropic mixtures, that is to say mixtures which boil at constant temperature and behave in this respect like individual substances. By selecting a substance, hereinafter referred to as an entraining agent, which yields with water a mixture boiling constantly at a temperature appreciably below the boiling point of acetic acid, water may readily be removed leaving a residue of substantially anhydrous acid.

We have now found a new method of effecting the concentration of aqueous or other solutions of organic substances, particularly aqueous solutions of acetic and other lower aliphatic acids, by separating the water or other solvent in the form of an azeotropic mixture with an entraining agent. According to the present invention, in effecting concentration by this method, the aqueous or other solution to be concentrated and the entraining agent are brought into contact while either or both are in vapour form.

The invention is of particular value in the concentration of aqueous acetic and other lower aliphatic acids and will therefore be more particularly described with respect to the concentration of these acids. The process may be applied for instance to the production of substantially anhydrous acid from dilute acetic acid such as crude pyroligneous acid or the dilute acid obtained as a by-product in acetylation processes, e. g. in the acetylation of cellulose.

The aqueous acid, heated to a suitable temperature, may for instance be treated with vapours of an entraining agent until the water has been removed to the desired degree as an azeotropic mixture with the entraining agent, whereupon the residual concentrated acid may, if necessary, be freed from any entraining agent which may remain therein.

If desired the process may be arranged so as to work continuously. For example the aqueous acid may be continuously supplied to a column, e. g. a column of the type used in fractional distillation, and treated in counter-current with vapours of the entraining agent. Water vapour in the form of an azeotropic mixture with entraining agent may be drawn off at or near the top of the column and concentrated acid from the lower end. The concentrated acid may subsequently be freed from any entraining agent it may contain, e. g. by distillation.

Separation of entraining agent from concentrated acid may, if desired, be effected in the same apparatus simultaneously with the removal of water as an azeotropic mixture. For example, where the boiling point of the entraining agent lies below that of the concentrated acid the separation may be accomplished by heating the lower part of the column and introducing the entraining agent vapours at a point some little way above the bottom. The lower part of the column may for instance be heated to the boiling point of the concentrated acid accumulating there.

Preferably however, in concentrating acetic or other lower aliphatic acid in accordance with the present invention, both the dilute acid and the entraining agent are brought together in vapour form, concentrated acid being separated from the mixed vapours.

The separation of concentrated acid from the mixed vapours may be accomplished in any convenient manner, for example by cooling the vapours so as to condense the acid while allowing the water vapour to pass away in the form of an azeotropic mixture with the vapour of the entraining agent.

Conveniently the separation of the concentrated acid may be effected with the aid of a column such as is used in fractional distillation. The column may for example be mounted upon a still provided with suitable heating means and charged with a quantity of the concentrated acid maintained in a state of ebullition. Vapours of dilute acid and of entraining agent are then introduced into the column, for example at a point about one third of the way from the lower end, an azeotropic mixture of water and the entraining agent being drawn off from the upper end of the column and passed to a condenser. The condensate may be allowed to separate into layers and the layer consisting of or containing the entraining agent returned to the system.

Concentrated acid free from entraining agent accumulates in the still and may be withdrawn as required.

Where vapours of entraining agents are utilized in accordance with the invention they may be produced in the apparatus in which separation of water as an azeotropic mixture is effected.

For example, when using a distillation column, the entraining agent may be introduced and vapourized at a point just below that of the point of inlet of the liquid or vapourized dilute acid.

It is preferred to introduce liquid entraining agent at a point of the column where concentrated or fairly concentrated acid is to be found in order that homogeneous admixture with the acid may occur. In this manner acid and entraining agent may be brought into the most intimate contact possible and the removal of water as an azeotropic mixture facilitated.

When separating an azeotropic mixture of water and entraining agent from concentrated acid with the aid of a fractional distillation column the latter may be provided with a dephlegmator or other means whereby a portion of the condensed azeotropic mixture may be returned to the upper end of the column. In this manner regulation of the temperature of the column may readily be effected.

Further, the heat of the vapours escaping from the upper end of the column and/or of the concentrated acid withdrawn from the lower end of the still may be utilized, for example, to preheat the aqueous acid and/or the entraining agent prior to vaporization and/or introduction into the system.

Any suitable entraining agents may be utilized in carrying out the processes of the present invention, for example hydrocarbons, e. g. benzene or xylene, halogenated hydrocarbons, for instance trichlor ethylene, dichlor ethylene or ethylene dichloride, esters, for instance ethyl, propyl or butyl acetate, or other bodies forming azeotropic mixtures with water. If desired mixtures of two or more substances may be employed as entraining agents, for example a mixture of ethyl acetate with benzene.

The invention has been more particularly described with reference to the concentration of aqueous solutions of acetic acid or other lower aliphatic acids, for example propionic or butyric acid. It may, however be applied to the concentration of other solutions of organic substances, for example, aqueous alcohols.

What we claim and desire to secure by Letters Patent is:—

1. In processes of separating liquid organic substances from mixtures containing them, wherein components of the mixtures are separated as azeotropic mixtures with entraining agents, the step of vaporizing the entraining agents before bringing them into contact with the mixtures to be separated.

2. In processes of separating liquid organic substances from mixtures containing them, wherein components of the mixtures are separated as azeotropic mixtures with entraining agents, the step of vaporizing both the entraining agent and the mixture of organic substances before bringing them into contact.

3. In a process of concentrating aqueous organic liquids, wherein water is separated as an azeotropic mixture with an entraining agent, the step of vaporizing the entraining agent before bringing it into contact with the aqueous substances.

4. In a process of concentrating aqueous solutions of lower fatty acids, wherein water is separated as an azeotropic mixture with an entraining agent, the step of vaporizing the entraining agent before bringing it into contact with the aqueous acids.

5. In a process of concentrating aqueous solutions of acetic acid, wherein water is separated as an azeotropic mixture with an entraining agent, the step of vaporizing the entraining agent before bringing it into contact with the aqueous acid.

6. A process of concentrating aqueous solutions of lower fatty acids, wherein water is separated as an azeotropic mixture with an entraining agent, comprising mixing vapors of the entraining agent with vapors of the aqueous acid and separating concentrated acid from the mixed vapors.

7. A process of concentrating aqueous acetic acid, wherein water is separated as an azeotropic mixture with an entraining agent, comprising mixing vapors of the entraining agent with vapors of the aqueous acid and separating concentrated acid from the mixed vapors.

8. A process of concentrating aqueous solutions of lower fatty acids, wherein water is separated as an azeotropic mixture with an entraining agent, comprising mixing vapors of the entraining agent with vapors of the aqueous acid and separating concentrated acid from the mixed vapors by cooling.

9. A process of concentrating aqueous lower fatty acids, wherein water is separated as an azeotropic mixture with an entraining agent, comprising introducing vapors of the entraining agent and vapors of the aqueous acid into a fractionating column, withdrawing concentrated acid from the lower part of the column and withdrawing an azeotropic mixture of water and entraining agent from the upper part of the column.

10. A process of concentrating aqueous acetic acid, wherein water is separated as an azeotropic mixture with an entraining agent, comprising introducing vapors of the entraining agent and vapors of the aqueous acetic acid into a fractionating column, withdrawing concentrating acetic acid from the lower part of the column and withdrawing an azeotropic mixture of water and entraining agent from the upper part of the column.

11. A process of concentrating aqueous acetic acid, wherein water is separated as an azeotropic mixture with benzene, comprising introducing vapors of the benzene and vapors of the aqueous acetic acid into a fractionating column, withdrawing concentrated acetic acid from the lower part of the column and withdrawing an azeotropic mixture of water and benzene from the upper part of the column.

HORACE FINNINGLEY OXLEY.
LEONARD FALLOWS.

CERTIFICATE OF CORRECTION.

Patent No. 1,936,172.  November 21, 1933.

HORACE FINNINGLEY OXLEY, ET AL.

It is hereby certified that error appears in the printed specifications of the above numbered patent requiring correction as follows: Page 2, line 125, claim 10, for "concentrating" read concentrated; and that the said Letters Patent should be read with this correction therein that the same may conform to the record of the case in the Patent Office.

Signed and sealed this 12th day of December, A. D. 1933.

F. M. Hopkins (Seal) Acting Commissioner of Patents.